US005915709A

United States Patent [19]

Radjenovic et al.

[11] Patent Number: 5,915,709

[45] Date of Patent: Jun. 29, 1999

[54] MODULAR CROSS MEMBER ASSEMBLY FOR ADJUSTABLE WHEELCHAIR

[75] Inventors: Wally Radjenovic, Parma; Neal J. Curran, Lakewood; Mike Devlin, Shaker Heights, all of Ohio

[73] Assignee: Invacare Corporation, Elyria, Ohio

[21] Appl. No.: 08/747,301

[22] Filed: Nov. 12, 1996

[51] Int. Cl.[6] .......... B62M 1/14

[52] U.S. Cl. .......... 280/250.1; 280/647

[58] Field of Search .......... 280/250.1, 211, 280/647, 649, 650, 657

[56] References Cited

U.S. PATENT DOCUMENTS

| | | | |
|---|---|---|---|
| 4,592,570 | 6/1986 | Nassiri | 280/250.1 |
| 4,799,700 | 1/1989 | Knoedler et al. | 280/649 |
| 4,813,693 | 3/1989 | Lockard et al. | 280/42 |
| 4,989,890 | 2/1991 | Lockard et al. | 280/250.1 |
| 5,263,728 | 11/1993 | Patel et al. | 280/250.1 |
| 5,328,183 | 7/1994 | Counts | 280/250.1 |

*Primary Examiner*—Lanna Mai

*Assistant Examiner*—Faye M. Fleming

*Attorney, Agent, or Firm*—Hudak & Shunk Co., L.P.A.

[57] ABSTRACT

A foldable wheelchair includes a cross brace assembly having first and second brace members pivotally secured to one another. First ends of the brace members are clamped to respective side frames of the wheelchair. Second ends of the brace members are removably secured to respective seat rails so that the cross brace assembly can be adjustably positioned forwardly and rearwardly along the side frames and seat rails. This provides for ease of seat depth adjustment that accommodates growth of the wheelchair user without having to purchase additional components.

18 Claims, 3 Drawing Sheets

MODULAR CROSS MEMBER ASSEMBLY FOR ADJUSTABLE WHEELCHAIR

BACKGROUND OF THE INVENTION

This invention pertains to the art of wheelchairs and, more particularly, to adjustable wheelchairs. The invention applies to an adjustable wheelchair where the seat depth can be easily altered to ensure a proper, comfortable, and posturally correct seat that adapts to various seating and positioning systems, as well as dimensional changes as the user grows. The invention is particularly described with reference to a collapsible or folding lightweight wheelchair that is custom manufactured to meet the user's measurements and dimensional configuration. However, it will be appreciated that the invention has broader applications and may find application and use in related wheelchairs.

Folding wheelchairs usually pivot or collapse via a cross brace assembly that is connected to the seat and side frames. A cross brace assembly that has met with commercial success is shown and described in commonly owned U.S. Pat. No. 4,813,693, the details and disclosure of which are hereby incorporated by reference. The '693 patent describes a cross brace assembly in which upper ends of the cross brace members are integrally secured to first and second seat rails, respectively. The seat rails extend in parallel fashion along side edges or perimeter portions of the seating surface, typically supporting marginal edges of a collapsible seat material. Likewise, the seat back is also typically formed from a collapsible material so that when the wheelchair is folded, the material easily folds thereby allowing the side frames and accompanying wheels to be brought closer together in a collapsed condition for storage or transportation.

The '693 patent teaches a variety of adjustable features that allow the chair to accommodate a growing child. Thus, a telescopic arrangement allows the length of the seats to be increased but it is necessary to substitute the cross brace assembly with a new assembly since the cross members are integrally secured to the seat rails. Thus, even though the wheelchair is adjustable to accommodate the growth of a child or a new seating/positioning system, a new cross brace assembly is required to accommodate the change.

The subject invention is intended to adapt to a growing user or a new seating/positioning system while employing the same components to achieve this objective.

SUMMARY OF THE INVENTION

The present invention contemplates a new and improved cross brace assembly and a wheelchair incorporating the cross brace assembly that overcomes the above-referenced problems and others and provides a simple, economical alternative to adjusting the seat depth in a foldable wheelchair.

According to the present invention, a cross brace assembly includes first and second brace members removably secured at first ends to first and second seat rails, respectively, and having second ends removably secured to first and second side frames, respectively.

According to another aspect of the invention, a saddle portion is provided on the first end of each brace member for receipt about the periphery of a respective seat rail.

According to yet another aspect of the invention, plural openings are provided in the seat rails for receiving removable fasteners so that the cross brace assembly can be easily adjusted forwardly and rearwardly along the seat rails, i.e. the depth of the chair can be adjusted.

A principal advantage of the invention is the reduced number of components that still achieve the desired adjustability in a folding wheelchair.

Yet another advantage of the invention resides in the ease with which the seat depth may be adjusted.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
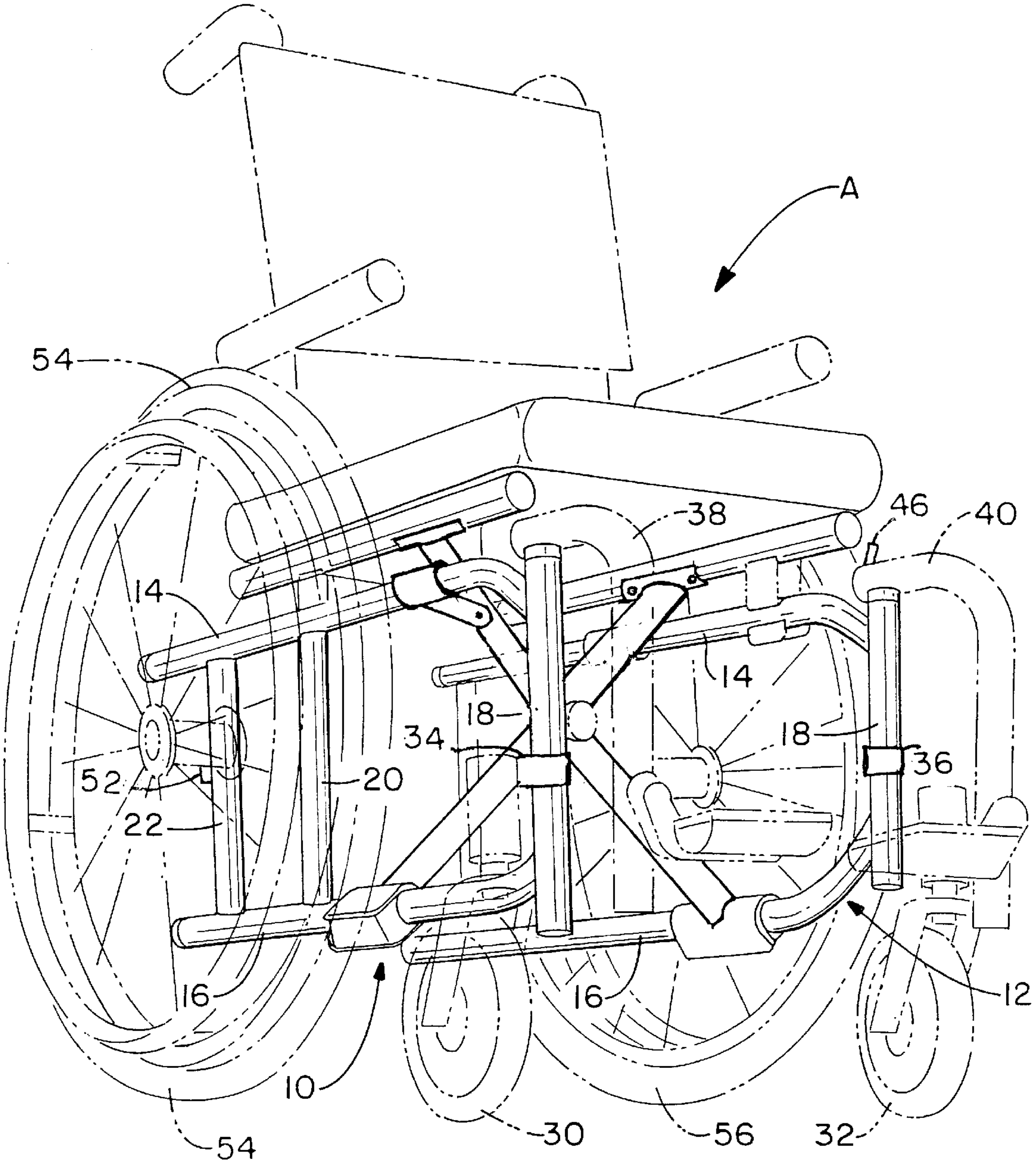
FIG. 1 is a front, left-hand perspective view of a folding wheelchair incorporating the subject invention.

Referring now to the drawings wherein the showings are for the purposes of illustrating the preferred embodiment of the invention only and not for purposes of limitation, the FIGURES show a wheelchair A incorporating a new cross brace assembly B. More particularly, and with reference to FIG. 1, the wheelchair A includes a pair of first and second side frame assemblies 10, 12, each side frame assembly preferably formed of lightweight metal tubes integrally secured together such as by welding. FIG. 2 illustrates the left-hand side frame assembly 10, although one skilled in the art will understand that the description is equally applicable to the right-hand side frame assembly since they are mirror images of one another. The assembly includes a first or upper horizontal member 14 disposed in generally parallel relation with a second or lower horizontal member 16. A first vertical member 18 interconnects the front, terminal ends of the horizontal members. Also provided are second and third vertical members 20, 22 which are preferably disposed adjacent and interconnect the second or rear ends of the horizontal members. Like the vertical member 18, the second and third vertical members 20, 22 are preferably integrally secured to the horizontal members such as by welding the individual metal tubes together. Of course other frame arrangements can be used without departing from the scope and intent of the subject invention.

Figure 2:
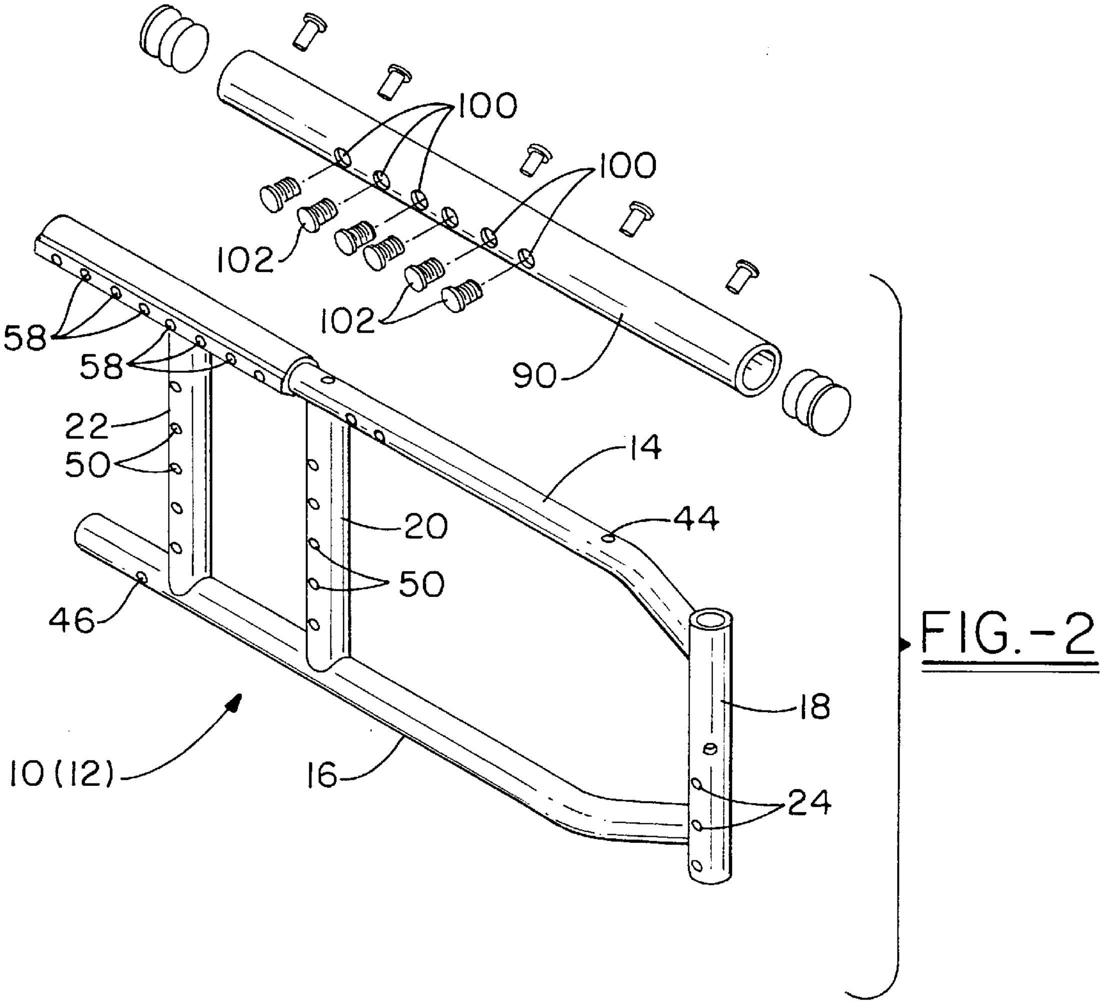
FIG. 2 is a perspective view of a side frame and seat rail for the left-hand side of the wheelchair.

The vertical member 18 is used to support and mount first and second front wheels 30, 32 to the wheelchair, as well as front riggings to comfortably support the user's legs (FIG. 1). The front wheels are typically small diameter wheels that are caster mounted to allow the wheels to turn in response to a driving force imposed on the rear wheels. A series of openings in the vertical member 18 are adapted to receive fasteners that mount the front wheel to the frame. Still other openings are provided to support a latching mechanism 34, 36 associated with footrest riggings 38, 40. A number of conventional, commercially available front riggings can be secured thereto, as well as optional foot plate assemblies as may be required or desired by the wheelchair user.

Each first horizontal member 14 preferably includes an opening 44 adjacent the front end for securing a wheel lock assembly 46. Additionally, the lower horizontal frame members 16 each include an opening 46 for receiving an anti-tip mechanism (not shown). A series of spaced openings 50 are also provided along the second and third vertical interconnecting members 20, 22. These openings receive fasteners associated with rear wheel mounting assemblies 52 for rear wheels 54, 56. As will be recognized, the openings 50 allow vertical height adjustment of the rear wheel mounts as desired or needed to accommodate growth of the user.

Spaced openings 58 are provided on the horizontal member for adjustably mounting a seat back to the frame. Again, the openings are spaced apart to allow incremental adjustment of the seat back to accommodate growth of the user or a new seating/positioning system. More particular details of the seat back mounting arrangement are well known in the art so that further discussion is deemed unnecessary to full and complete understanding of the subject invention.

Figure 4:
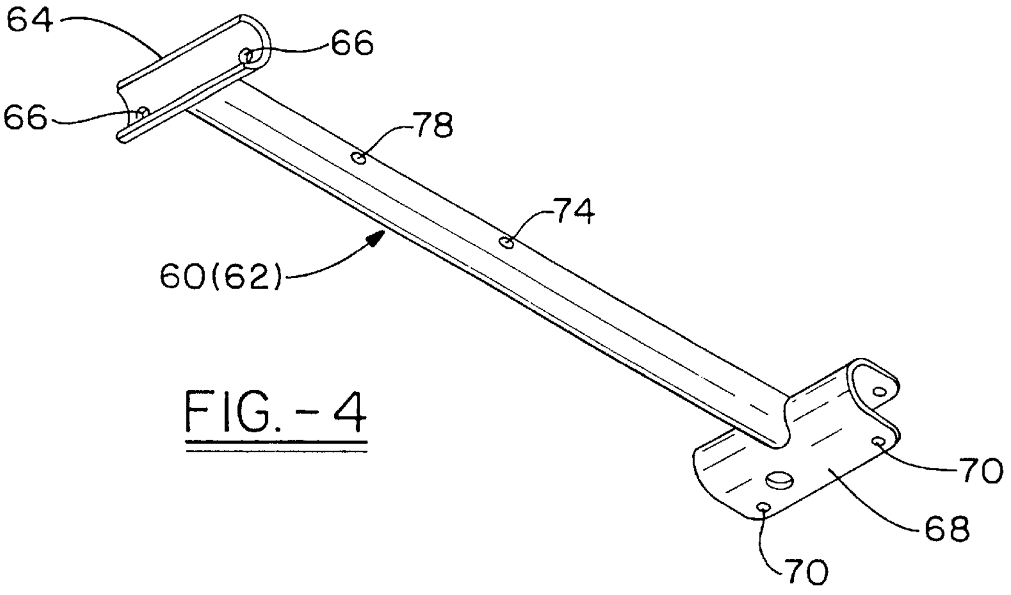
FIG. 4 is a perspective view of a new cross brace member used in the assembly of FIG. 3.
Figure 3:
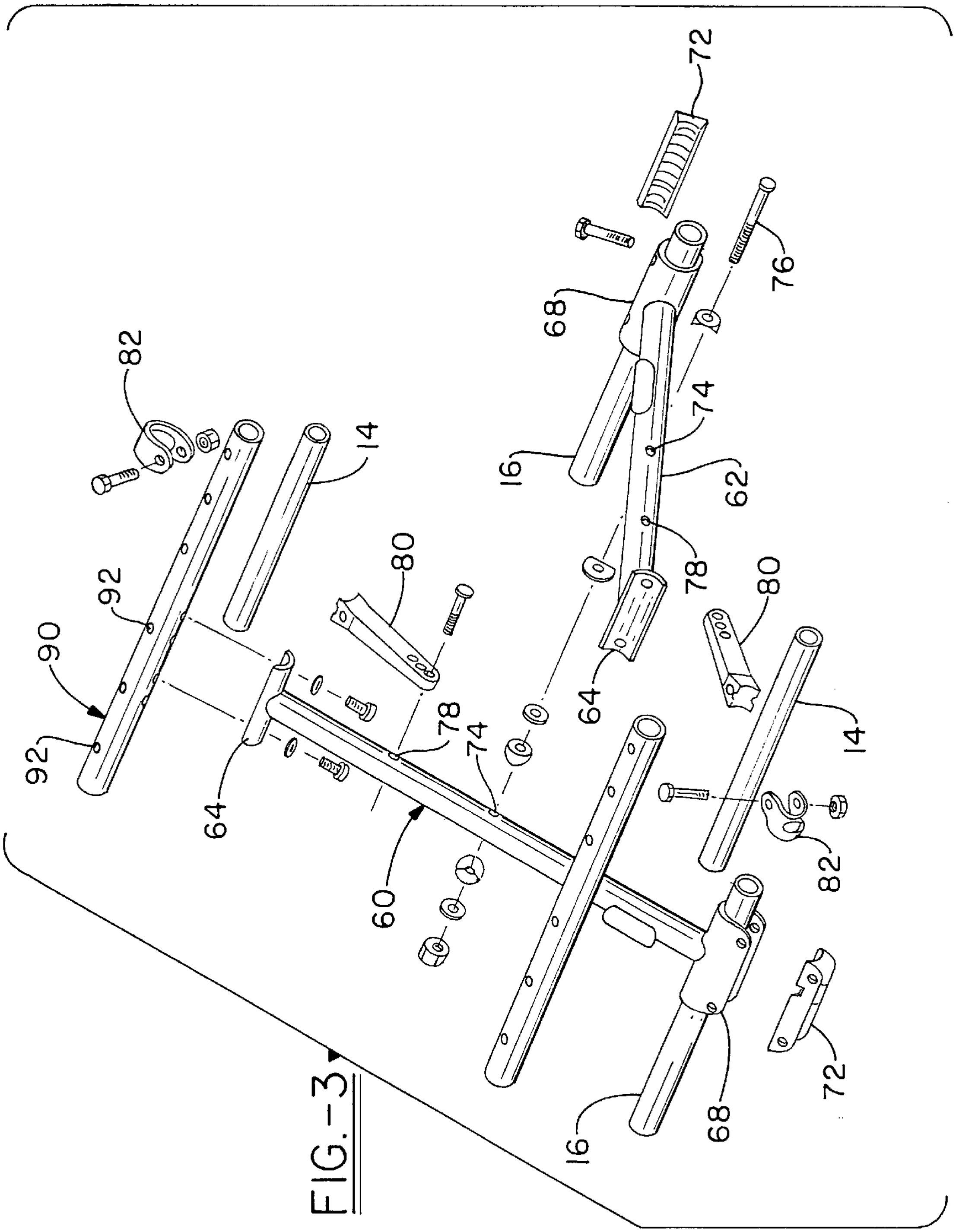
FIG. 3 is an exploded perspective view of the cross brace assembly incorporating the subject invention.

FIG. 3 illustrates the foldable cross brace assembly B of the subject invention. It includes a pair of cross brace members 60, 62. A representative cross brace member is shown individually in FIG. 4, it being understood that the cross brace members are preferably of identical construction. A first or upper end of the cross brace member is provided with a shallow curvilinear recess 64 and has a pair of openings 66 adapted to receive fasteners therein. The recess conforms to the periphery of a side rail as will be described in greater detail below. The opposite end of the cross brace member also includes a recess, although this recess 68 is generally U-shaped in cross section. It, too, includes a pair of openings 70 to receive fasteners which secure a clamp member 72 to fully embrace the lower horizontal frame member 16 of an associated side frame assembly 10, 12. The clamp assembly at the lower end of each cross brace member allows adjustment of the cross brace assembly along the lower horizontal frame member 16 between the vertical members 20 and 24.

A central opening 74 allows the cross brace members to be pivotally secured together by an elongated fastener 76. Moreover, an additional opening 78 receives a fastener for pivotally securing one end of a cross brace link 80 while the other end of the link is secured by a U-shaped bracket 82 to the upper horizontal side frame member 14.

The shallow recess 64 provided on the upper end of each cross brace member is secured to an associated seat rail 90 (FIGS. 2 and 3). Each seat rail is preferably a tubular construction having a series of spaced openings 92 used to secure the seat portion of a seat assembly thereto. An additional series of openings 100 (FIG. 2) receive fasteners that extend through openings 66 in the recess 64 of each cross brace member. As will be understood, only a pair of the openings 100 is required to secure the cross brace member to a respective seat rail. The plural openings 100, however, allow selective axial adjustment which provides for adjustable depth of the seat portion on the wheelchair. Those openings that are not used for securing the cross brace member can be temporarily filled by threaded inserts 102.

Thus, in accordance with the subject invention, each cross brace member can be selectively adjusted relative to the seat rails and side frame assembly. The clamp assembly defined by the U-shaped recess 68 and clamp member 72 with the lower portion of each cross brace member secures it to a respective side frame assembly. By removing a pair of fasteners, the clamp member 72 can be released and the cross brace assembly adjusted along the horizontal frame member 16. At the upper end of each cross brace member, the fasteners are removed from aligned openings 66, 100 so that the cross brace member can be adjusted axially along the respective seat rail 90. This allows the seat depth to be easily adjusted, for example in one inch increments, without the additional purchase or supply of components.

If a still greater amount of seat depth adjustment is required, only a side rail 90 need be replaced with a new set of multiple openings 100 to accommodate further adjustment. This is to be contrasted with the prior arrangement where the cross brace assembly was integrally secured to a portion of a seat rail. If depth adjustment were desired in such an arrangement, the entire cross brace assembly required replacement.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A cross brace assembly for a wheelchair, the cross brace assembly comprising:

first and second side frames;

first and second seat rails adapted to be secured to opposite sides of an associated seat; and first and second brace members having first ends removably secured to the first and second side frames, respectively, and second ends removably secured to the first and second seat rails, respectively, so that the cross brace assembly is depth adjustable relative to the seat rails and the side frames.

2. The invention of claim 1 further comprising removable fasteners for securing the brace members to the seat rails.

3. The invention of claim 1 further comprising a saddle portion on the second end of each brace member that is received about a portion of the periphery of the respective seat rail.

4. The invention of claim 1 further comprising plural openings in the seat rails for receiving removable fasteners therein whereby the cross brace assembly can be adjusted forwardly and rearwardly along the seat rails.

5. The invention of claim 1 further comprising a saddle portion on the second end of each brace member and extending generally perpendicular thereto, the saddle portion having a concave surface that mates with a tubular periphery of the seat rails.

6. The invention of claim 1 wherein the second ends of the brace members are removably fastened to the seat rails and do not pivot relative to the seat rails when secured thereto.

7. The invention of claim 1 wherein the first ends of the brace members are clampingly received about the first and second side frames, respectively, and can be axially adjusted relative to the side frames.

8. The invention of claim 1 wherein the brace members are pivotally secured to one another along median portions thereof.

9. A wheelchair comprising:

first and second side frames;

a seat;

first and second seat rails secured to opposite sides of the seat; and a cross brace assembly including first and second brace members pivotally secured to one another between first and second ends of each brace member, the first ends of the brace members being pivotally clamped to respective side frames and the second ends of the brace members being removably fastened to respective seat rails such that the cross brace assembly can be adjustably positioned forwardly and rearwardly between the side frames.

10. The wheelchair of claim 9 further comprising multiple fastener locations on the first and second seat rails whereby the cross brace assembly can be adjusted relative to the seat rails.

11. The wheelchair of claim 9 wherein the brace members first ends are clampingly engaged to the side frames.

12. The wheelchair of claim 11 wherein second ends of the brace members include a saddle portion that is partially received about the periphery of respective seat rails and fastened thereto by removable fasteners.

13. The wheelchair of claim 9 wherein the first ends of the brace members are axially movable relative to the respective side frames.

14. The wheelchair of claim 9 wherein the second ends of the brace members are non-rotatably fastened to respective seat rails.

15. A wheelchair having modular components to permit expansion and repositioning in response to user need comprising;

first and second side frames;

a seat having opposing lateral first and second sides each having a longitudinal axis;

first and second seat rails respectfully secured to said opposing lateral sides; and a removable cross brace assembly having first and second brace members, each having a first and second axis being pivotally secured to one another between said first and second ends and the first ends of said brace members being removably pivotally secured to respective side frames and the second ends of said brace members being removably securable at a plurality of positions along the longitudinal axis of said respective seat rails.

16. A wheelchair as set forth in claim 15, wherein the first ends of said brace members are each secured to each of said respective side frames by a clamping member.

17. A wheelchair as set forth in claim 16, wherein the second ends of said brace members each include a saddle which receives as respective one of said seat rails.

18. A wheelchair as set forth in claim 17, wherein each of said seat rails have a plurality of holes along the longitudinal axis at least one of which receives a pin which locks said respective seat rails in position in said respective saddle.

* * * * *